United States Patent [19]
Gastebois et al.

[11] Patent Number: 4,974,638
[45] Date of Patent: Dec. 4, 1990

[54] TRANSITION PIPE FOR A JET PIPE ASSEMBLY OF A TURBOJET ENGINE

[75] Inventors: Philippe M. D. Gastebois, Vert Saint Denis; Marc G. Loubet, Nandy; Gérard E. A. Jourdain, Corbeil Essonnes, all of France

[73] Assignee: Societe Nationale d'Etude et de Construction de Moteurs D'Aviation "S.N.E.C.M.A.", Paris, France

[21] Appl. No.: 260,775

[22] Filed: Oct. 21, 1988

[30] Foreign Application Priority Data

Oct. 21, 1987 [FR] France .............. 87 14517

[51] Int. Cl.$^5$ .............................................. F16L 9/18
[52] U.S. Cl. .................................... 138/113; 138/108; 138/111; 138/114; 138/148
[58] Field of Search ............... 138/103, 110, 108, 111, 138/112, 113, 114, 115, 116, 148, 178

[56] References Cited

U.S. PATENT DOCUMENTS

| | | | |
|---|---|---|---|
| 2,544,538 | 3/1951 | Mahnken et al. | |
| 2,795,373 | 6/1957 | Hewson | 138/148 |
| 2,926,490 | 3/1960 | Eaton et al. | 138/115 |
| 3,053,283 | 9/1962 | Allen et al. | |
| 3,224,678 | 12/1965 | Rosman | 138/116 |
| 3,430,663 | 3/1969 | Sickbert | 138/148 |
| 4,382,401 | 5/1983 | Simmler | 138/115 |

FOREIGN PATENT DOCUMENTS

| | | |
|---|---|---|
| 1102811 | 10/1955 | France . |
| 2249769 | 5/1975 | France . |
| 2326585 | 4/1977 | France . |
| 2445895 | 8/1980 | France . |
| 2608680 | 6/1988 | France . |

*Primary Examiner*—James E. Bryant, III
*Attorney, Agent, or Firm*—Oblon, Spivak, McClelland, Maier & Neustadt

[57] ABSTRACT

A transition pipe for location between an afterburner pipe and a jet nozzle in a jet pipe assembly for a turbojet engine comprises a funnel shaped inner casing tapering downstream from a circular section at its upstream end to a quadrangular section at its downstream end, a horn shaped outer casing surrounding the inner casing and flared downstream from a circular upstream end section to a downstream end section formed of four joined segments of generally parabolic shape, and a plurality of peripherally spaced, longitudinally extending stiffeners interconnecting the inner and outer casings in the space therebetween.

11 Claims, 7 Drawing Sheets

TRANSITION PIPE FOR A JET PIPE ASSEMBLY OF A TURBOJET ENGINE

BACKGROUND OF THE INVENTION

1. Field of the invention

The present invention relates to a transition pipe for location in a jet pipe assembly of a turbojet engine between an afterburner pipe and a jet nozzle.

2. Summary of the prior art

In a turbojet engine the afterburner pipe in which the gases intended for discharge circulate usually has a generally circular cross-sectional shape. Research aimed at improving performance, simplification, and various other objectives, such as the reduction of overall size or kinematic optimization, has led, in some cases, to the use of jet nozzles of the type known as "bi-dimensional", the fixed structure of which has a square or rectangular section. French Pat. No. 2608680, for example, discloses an adjustable bi-dimensional jet nozzle of this type.

French Pat. No. 2326585 also relates to a bi-dimensional jet nozzle assembly. The transition pipe envisaged is not, however, satisfactory for certain applications and, in particular, the construction proposed poses a number of difficulties as regards the use of composite materials, which exhibit advantageous characteristics at the high temperatures encountered in use. In particular, with the known constructions the transition pipe is subjected to bending moments as a result of the mechanical stresses which develop during use, the thermal expansions exerted in differential manner on various elements, and deformations.

The object of the invention is to provide a transition pipe construction which reduces the mechanical stresses to simple tensile or compressive stresses, reduces mechanical stresses of thermal origin, and enables achievement of an optimum distribution of thicknesses making it possible to obtain a reduction in mass and permitting a different selection of materials, particularly of composite type, and their use under the best conditions for their performance in service depending on the type of mechanical stress, especially tensile or compression according to the particular case.

SUMMARY OF THE INVENTION

To this end, according to the invention there is provided a transition pipe for a jet pipe assembly of a turbojet engine wherein said jet pipe assembly includes an afterburner pipe upstream of said transition pipe and a jet nozzle of the bi-dimensional type downstream of said transition pipe, said transition pipe comprising:

an inner casing defining a portion of the main gas flow path through said jet pipe assembly and having upstream and downstream ends, said inner casing being funnel-shaped and tapering in the downstream direction from a circular section at its upstream end to a quadrangular section with rounded corners at its downstream end;

an outer casing also having upstream and downstream ends and surrounding said inner casing, said outer casing being horn-shaped and flaring in the downstream direction from a circular section at its upstream end; and a plurality of elements forming stiffeners interconnecting said inner and outer casings, said stiffener elements extending longitudinally in the space between said inner and outer casings and increasing in height from said upstream ends to said downstream ends, and said stiffener elements being substantially evenly distributed around said casings.

The invention will be further understood from the following description of several embodiments of the invention with reference to the accompanying drawings.

DESCRIPTION OF THE PREFERRED EMBODIMENTS

Figure 1:
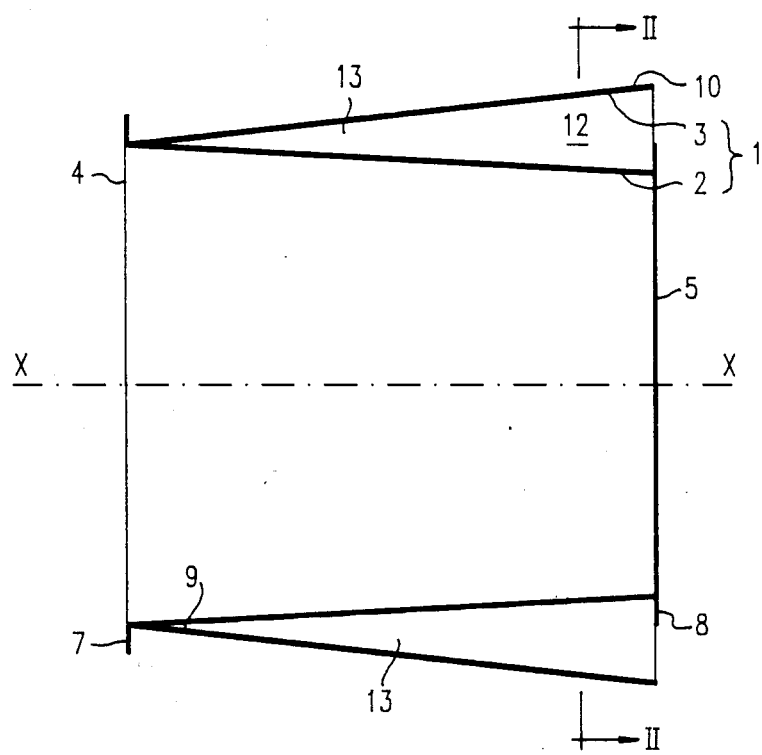
FIG. 1 is a diagrammatic longitudinal section through one embodiment of a transition pipe in accordance with the invention, taken in a plane passing through the axis X—X of rotation of the turbojet engine.
Figure 2:
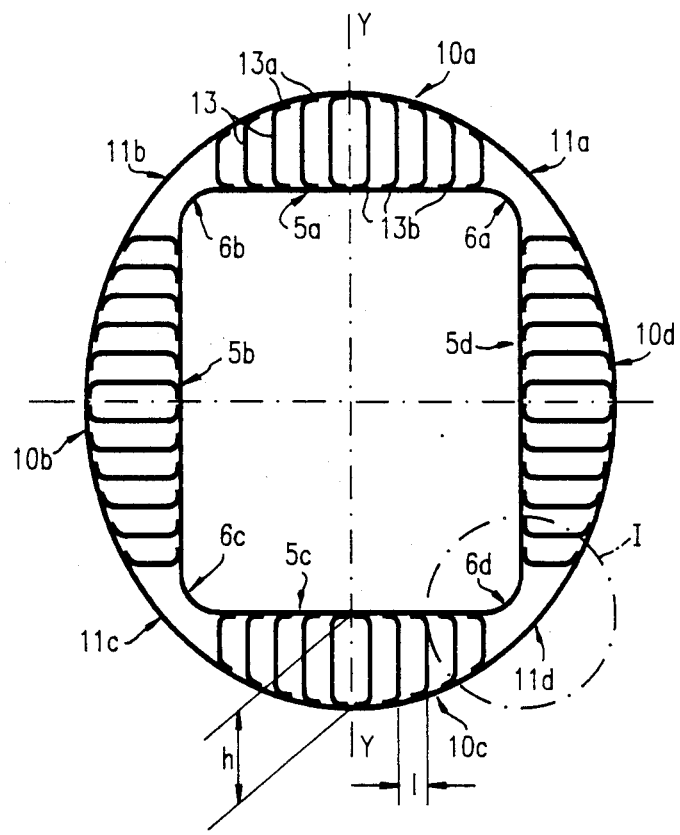
FIG. 2 is a diagrammatic cross-section through the transition pipe shown in FIG. 1, taken on the line II—II of FIG. 1.

A transition pipe 1 as shown in FIGS. 1 and 2 fits in a jet pipe assembly of a turbojet engine of a known type and not shown in the drawings. The transition pipe 1 is placed between, on the upstream side, an afterburner pipe and, on the downstream side, a jet nozzle of the bi-dimensional type and the upstream fixed connection collar of which is generally of quadrangular, square or rectangular shape. Upstream and downstream as used herein are defined relative to the normal direction of gas flow through the main flow path of the turbojet engine.

The transition pipe 1 comprises an inner casing 2 and an outer casing 3. The inner casing 2, shown in longitudinal section in FIG. 1, has the shape of a funnel or truncated pyramid, the larger end 4 of which has a circular section and is situated at the upstream end. The downstream edge 5 of the inner casing 2 has a quadrangular section having four sides 5a, 5b, 5c and 5d which are joined by rounded corners 6a, 6b, 6c and 6d, as shown in FIG. 2. The inner casing 2 carries at its upstream edge a circular collar 7 for fixing to the upstream afterburner pipe of the turbojet engine, and at its downstream edge 5 the inner casing carries a collar 8 of quadrangular shape for fixing to the bi-dimensional nozzle of the engine.

Figure 2A:
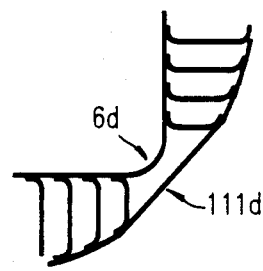
FIG. 2a is a view corresponding to the detail I of FIG. 2, but showing an alternative construction.

The upstream end 9 of the outer casing 3 has a circular section and is connected to the inner casing 2 adjacent the upstream circular collar 7. The outer casing 3 also has, in the longitudinal section shown in FIG. 1, the shape of a truncated pyramid or horn, but flaring in the downstream direction. The downstream end 10 of the outer casing 3 has a section as shown in FIG. 2, comprising four segments 10a, 10b, 10c, 10d, respectively arranged facing the four sides 5a, 5b, 5c, 5d of the downstream edge 5 of the inner casing 2. The four segments 10a, 10b, 10c, 10d each have a generally parabolic shape and are joined together by arcuate portions 11a, 11b, 11c, 11d, respectively arranged facing the four rounded corners 6a, 6b, 6c, 6d of the inner casing 2. Alternatively, as represented in FIG. 2a, the connections between the parabolic segments 10a, 10b, 10c, 10d may comprise straight portions 111d.

In the space 12 thus formed between the inner casing 2 and the outer casing 3 there are a number of longitudinally extending stiffeners 13 of generally triangular shape interconnecting the inner and outer casings 2 and 3, the tip of each stiffener 13 being situated towards the circular collar 7 at the upstream end. The stiffeners 13 are substantially evenly distributed around the periphery of the pipe 1 between the rounded corners 6a, 6b, 6c, 6d, as shown in FIG. 2, and each stiffener 13 has an outer flanged edge 13a cooperating with the outer casing 3 and an inner flanged edge 13b cooperating with the inner casing 2.

The inner wall of the transition pipe 1 just described is subjected, in operation, to a differential pressure p which can reach, in some applications, 0.3 MPa for example. Depending upon the maximum height h of the stiffeners 13 in the plane of symmetry of the space 12 passing through the rotational axis XX of the turbojet engine, and upon the wall thickness chosen for the stiffeners, a pitch 1 for the spacing between adjacent stiffeners 13 is determined, from which the wall thickness of the inner casing 2 is deduced depending on the materials selected. It follows from the structure of the transition pipe thus obtained that the outer casing 3 is subjected only to mechanical tensile stresses, whereas the stiffeners 13 or the inner casing 2 are subjected to compressive stresses. A composite material of the ceramic type having good properties in the hot state and exhibiting good resistance to compressive stresses is thus suitable for the inner casing 2 which, in use, is in contact with the hot gases of the jet flow through the transition pipe 1, whereas a composite material of a carbon-based or glass-based type with good tensile properties is suitable for the outer casing 3 which is subjected to lower temperatures. The materials of the casing 2 and 3 and the stiffeners 13, are also chosen so as to prevent the occurrence of thermal stresses due to differences in heat expansion coefficients.

Taking into account the foregoing aims and the variations in the conditions of use depending on the particular applications, several different arrangements may be considered for the stiffeners 13, each presenting advantages depending upon the case envisaged.

Figure 3:
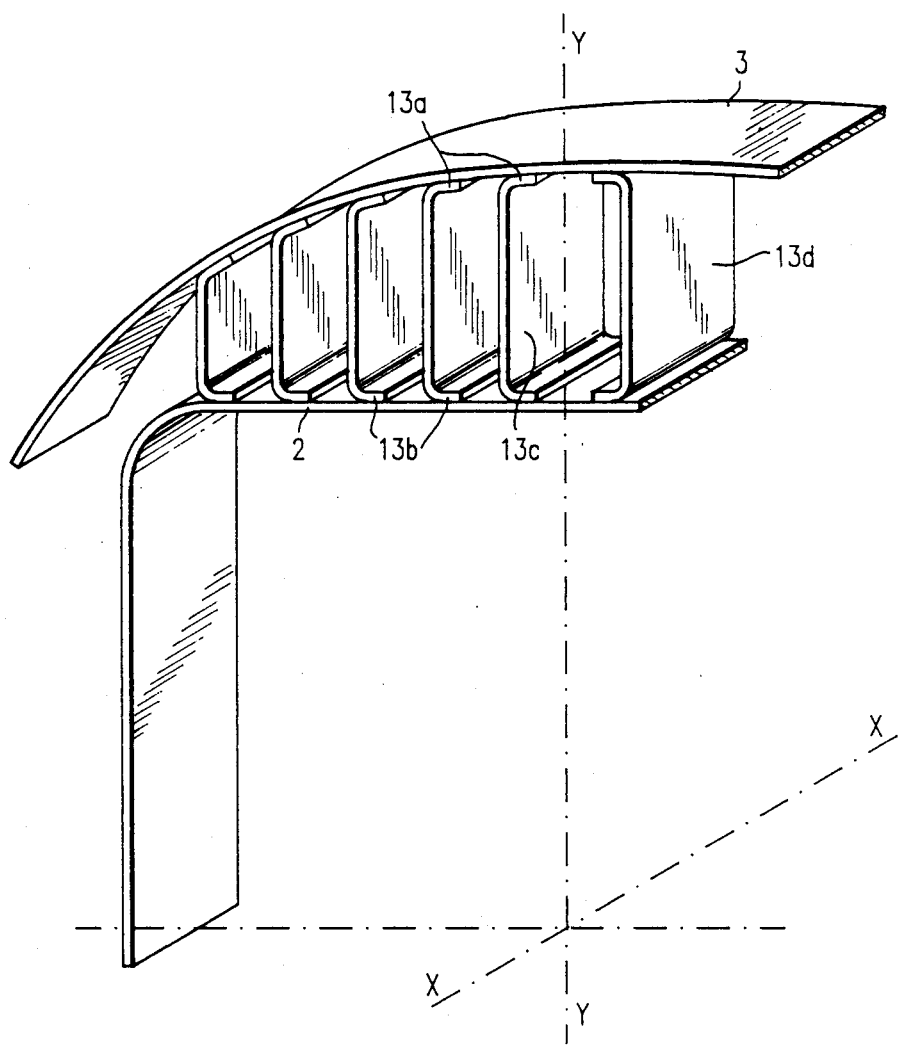
FIG. 3 is a partial perspective view of a portion of the transition pipe represented in FIGS. 1 and 2, illustrating the arrangement of the stiffeners.

The arrangement of the stiffeners 13 in the embodiment already shown in FIGS. 1 and 2 is illustrated in the detail of FIG. 3. The flanged edges 13a and 13b of the stiffeners 13 are turned towards the plane of symmetry XY of the space 12, the central stiffeners 13c and 13d being separated from each other on opposite sides of said plane of symmetry XY.

Figure 4:
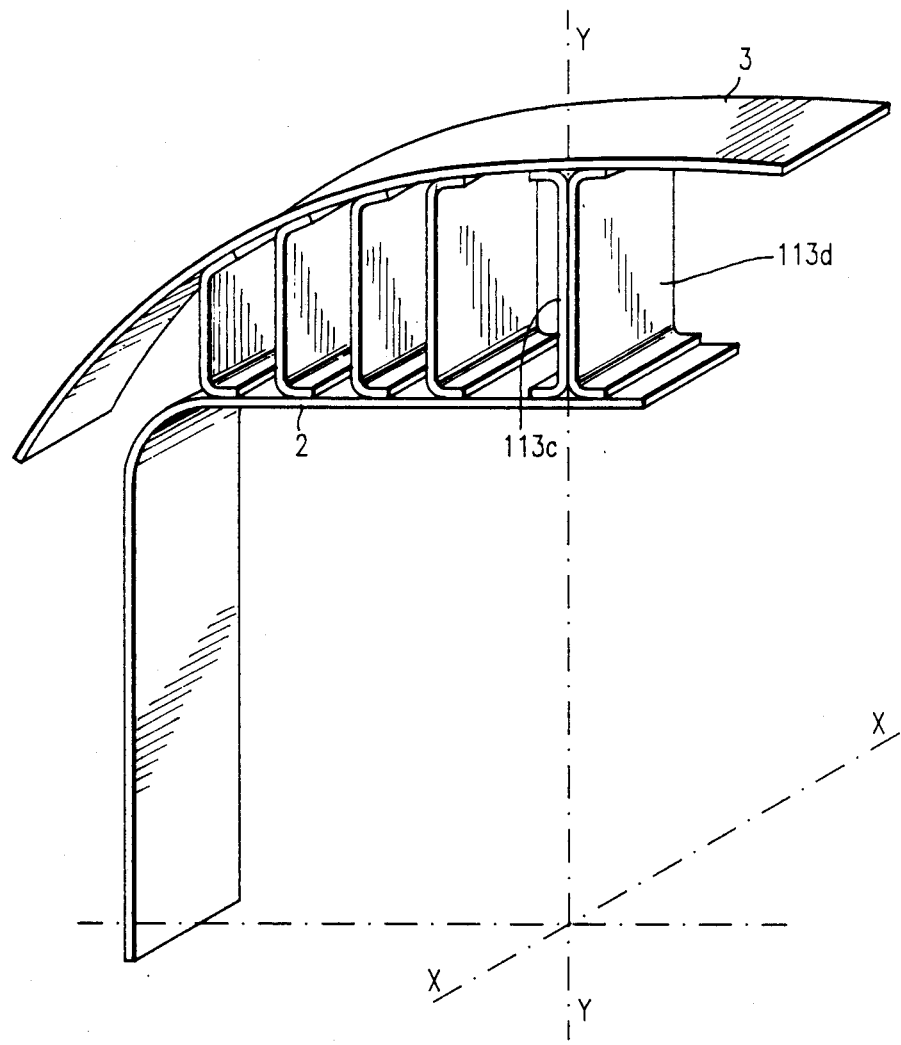
FIG. 4 is a view similar to that of FIG. 3, but of an alternative embodiment.

In the embodiment shown in FIG. 4, the stiffener arrangement is similar to that of FIG. 3 except that the adjacent central stiffeners 113c and 113d are reversed and coupled back to back in the plane of symmetry XY.

Figure 5:
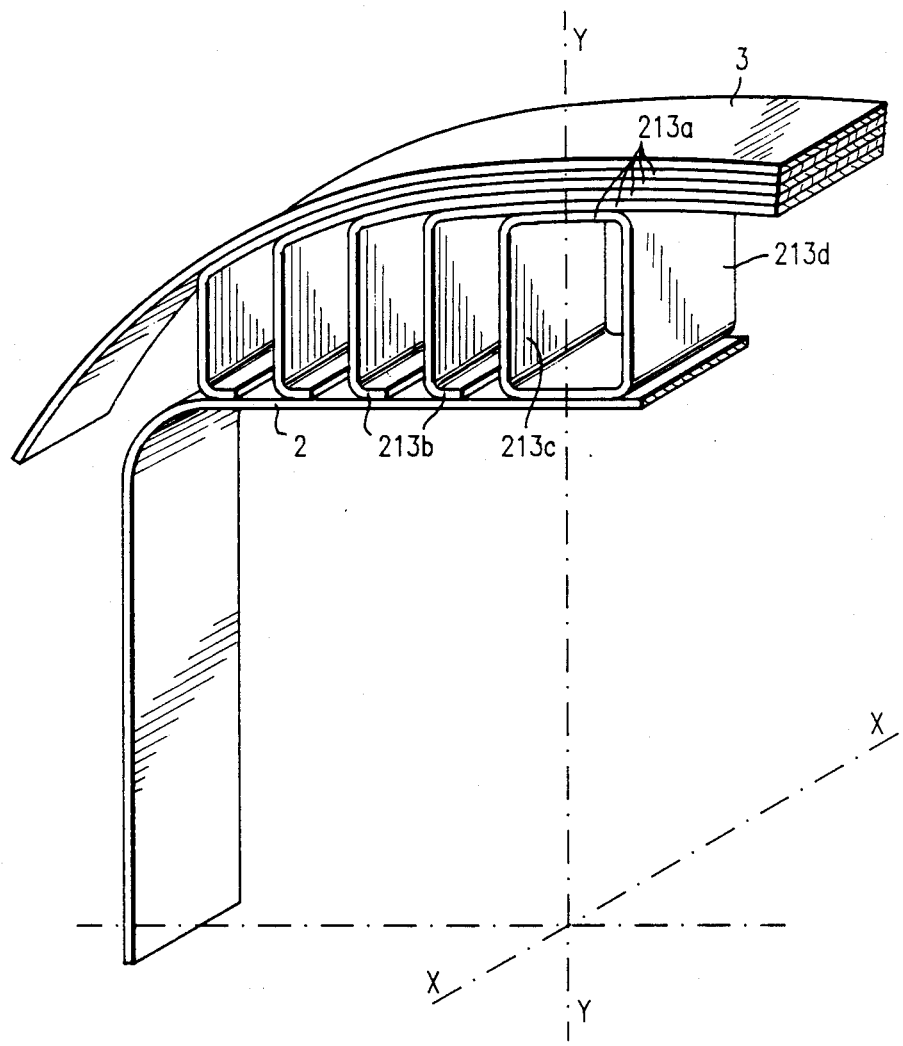
FIG. 5 is a view similar to those of FIGS. 3 and 4, but illustrating another embodiment.

In the embodiment shown in FIG. 5 each stiffener 213 has two longitudinal walls 213c and 213d which extend along the gap 12 symmetrically on opposite sides of its plane of symmetry XY, and which are joined by a third wall 213a extending between them at their radially outer edges. The inner edge of each wall 213c, 213d is provided with a flange 213b which is directed towards the plane of symmetry XY and is fixed to the inner casing 2. The inner flanged edges 213b of the central stiffener are extended and joined together so that the central stiffener has the form of a hollow beam with a quadrangular section. The outer walls 213a, starting from the central stiffener, are superimposed on each other against the inside of the casing 3 as shown.

Figure 6:
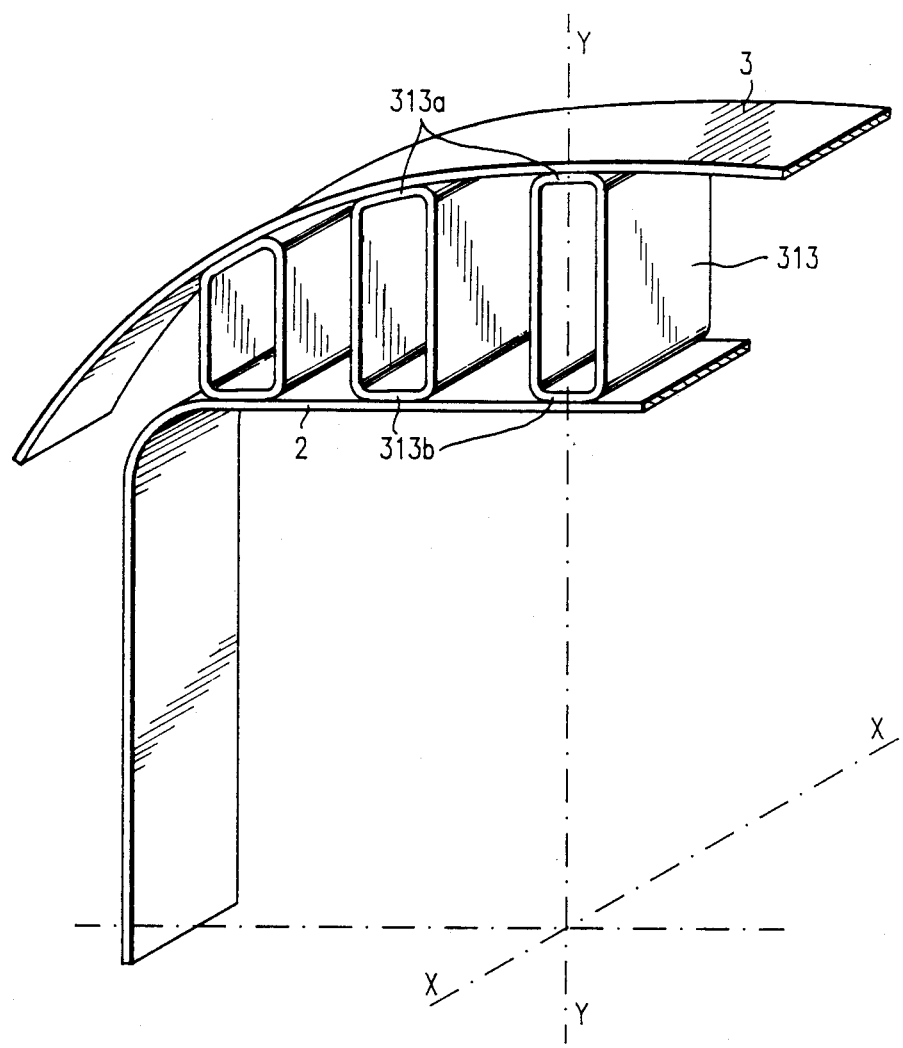
FIG. 6 is a view similar to those of FIGS. 3 to 5, but showing yet another embodiment.

In the embodiment shown in FIG. 6 the stiffeners 313 are formed as hollow beam structures of generally quadrangular cross-sectional shape, the outer face 313a of each stiffener cooperating with the outer casing 3 and the inner face 313b of each stiffener cooperating with the inner casing 2.

Figure 7:
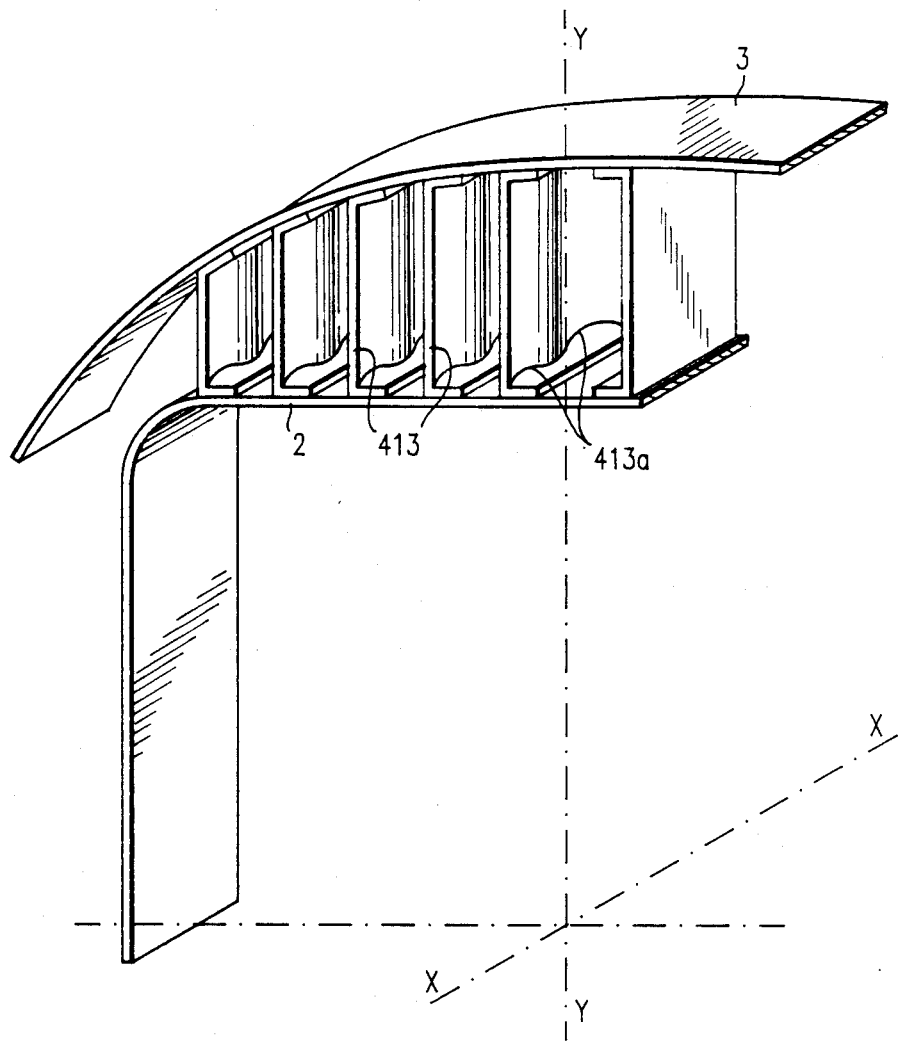
FIG. 7 is a view similar to those of FIGS. 3 to 6, showing a further embodiment.

In the embodiment shown in FIG. 7 the stiffeners 413 are arranged in a manner similar to that of the stiffeners 13 of the embodiment shown in FIGS. 2 and 3, but in this case the stiffener walls 413a, instead of being flat, are corrugated as shown.

What is claimed is:

1. A transition pipe for a jet pipe assembly of a turbojet engine wherein said jet pipe assembly includes an afterburner pipe upstream of said transition pipe and a jet nozzle of the bi-dimensional type downstream of said transition pipe, said transition pipe comprising:
   an inner casing defining a portion of the main gas flow path through said jet pipe assembly and having upstream and downstream ends, said inner casing being funnel-shaped and tapering in the downstream direction from a circular section at its upstream end to a quadrangular section with rounded corners at its downstream end;
   an outer casing also having upstream and downstream ends and surrounding said inner casing, said outer casing being horn-shaped and flaring in the downstream direction from a circular section at its upstream end; and
   a plurality of elements forming stiffeners interconnecting said inner and outer casings, said stiffener elements extending longitudinally in the space between said inner and outer casings and increasing in height from said upstream ends to said downstream ends, and said stiffener elements being substantially evenly distributed around said casings.

2. A transition pipe according to claim 1, including a circular fixing collar at said upstream end of said inner casing for attachment to said afterburner pipe, and a collar of quadrangular peripheral shape at the downstream end of said inner casing for attachment to said bi-dimensional jet nozzle.

3. A transition pipe according to claim 1, wherein said outer casing has a section at its downstream end defined by four segments of generally parabolic shape respectively arranged facing the four sides of said quadrangular section at the downstream end of said inner casing, and portions joining said parabolic segments facing the rounded corners of said quadrangular section of said inner casing.

4. A transition pipe according to claim 3, wherein said portions joining said parabolic segments define arcs of a circle.

5. A transition pipe according to claim 3, wherein said portions joining said parabolic segments are substantially straight.

6. A transition pipe according to claim 1, wherein each of said stiffener elements has flanged inner and outer edges respectively joined to said inner and outer casings.

7. A transition pipe according to claim 6, wherein said space between said inner and outer casings comprises four regions between said rounded corners of said inner casing, each of said regions having a plane of symmetry extending through the axis of said casings, and said stiffener elements in each of said regions are arranged symmetrically pairwise relative to said plane of symmetry of said region, with said flanged inner and outer edges of each of said stiffener elements facing towards said plane of symmetry and the two central stiffener elements being spaced apart from each other on opposite sides of said plane of symmetry.

8. A transition pipe according to claim 6, wherein said space between said inner and outer casings comprises four regions between said rounded corners of said inner casing, each of said regions having a plane of symmetry extending through the axis of said casings, and said stiffener elements in each of said regions are arranged symmetrically pairwise relative to said plane of symmetry of said region, with the two central stiffener elements coupled back to back in said plane of symmetry and their flanged inner and outer edges facing away therefrom, and with said flanged edges of the other stiffener elements facing towards said plane of symmetry.

9. A transition pipe according to claim 1, wherein said space between said inner and outer casings comprises four regions between said rounded corners of said inner casing, each of said regions having a plane of symmetry extending through the axis of said casings, and said stiffener elements in each of said regions each comprise a pair of longitudinal walls extending substantially parallel to said plane of symmetry and disposed symmetrically on opposite sides thereof, a cross wall joining said pair of longitudinal walls at the outer edges thereof, and a flange at the inner edge of each of said longitudinal walls facing towards said plane of symmetry, said cross walls of said stiffener elements being superimposed on each other and joined to said outer casing, and said inner edge flanges of said stiffener elements being joined to said inner casing with the inner edge flanges of the central stiffener element also being joined to each other.

10. A transition pipe according to claim 1, wherein said stiffener elements are each in the form of a hollow beam of generally quadrangular cross-section, each of said elements having inner and outer faces respectively joined to said inner and outer casings.

11. A transition pipe according to claim 7, wherein each of said stiffener elements has a corrugated section in a plane perpendicular to said plane of symmetry and parallel to the axis of said casings.

* * * * *